United States Patent [19]

Jasinski et al.

[11] 3,812,892
[45] May 28, 1974

[54] TREE HARVESTER AND METHOD

[75] Inventors: Stanley C. Jasinski; Leo J. Wenstrup; Bryant Duffty, all of Woodstoch, Ontario, Canada

[73] Assignee: Eaton Yale Ltd., London, Ontario, Canada

[22] Filed: June 9, 1972

[21] Appl. No.: 261,237

[52] U.S. Cl............................ 144/309 AC, 144/3 D
[51] Int. Cl............................................. A01g 23/08
[58] Field of Search ............. 144/2 Z, 3 D, 309 AC

[56] References Cited
UNITED STATES PATENTS
| | | | |
|---|---|---|---|
| 3,461,928 | 11/1969 | Siiro | 144/3 D |
| 3,542,099 | 11/1970 | Gibson | 144/3 D |
| 3,554,245 | 1/1971 | Eynon | 144/3 D |

FOREIGN PATENTS OR APPLICATIONS
| | | | |
|---|---|---|---|
| 247,696 | 7/1969 | U.S.S.R. | 144/3 D |

Primary Examiner—Gerald A. Dost
Attorney, Agent, or Firm—Teagno & Toddy

[57] ABSTRACT

An improved tree harvester delimbs a tree as it is being felled. The tree harvester includes a vehicle having a felling boom assembly with a gripper assembly which securely grips a lower end portion of the trunk of a standing tree and a shear assembly which is actuated to sever the trunk of the tree adjacent to the ground. The felling boom assembly is then operated to swing the trunk of the tree from the standing position along an arcuate path extending over the vehicle. As the trunk of the tree moves along the arcuate path, it is delimbed by a delimber assembly which is disposed on the outer end of a delimber boom. The delimber assembly is moved along the trunk of the tree by pivoting a section of the delimbing boom relative to the vehicle as the tree moves from the standing position toward a fallen position. The delimber assembly advantageously includes a drive wheel which engages the trunk of the tree and is rotated by a motor to at least assist in moving the delimber assembly along the trunk of the tree as the tree is felled from the standing position.

17 Claims, 3 Drawing Figures

TREE HARVESTER AND METHOD

BACKGROUND OF THE INVENTION

This invention relates generally to a method and an apparatus for harvesting trees.

Known tree harvesting machines include mechanism for severing a standing tree as well as mechanism for delimbing the tree. One apparatus for harvesting the tree in this manner is disclosed in U.S. Pat. No. 3,252,487 in which a standing tree is delimbed and then severed. Another example is U.S. Pat. No. 3,340,912 in which a tree is first felled and then delimbed. When a tree is harvested with either of these known apparatuses and all other known apparatus, the tree is felled and delimbed in separate, sequentially performed, steps. Thus, these known machines sever and delimb a tree in the time that it takes to perform these operations in sequence.

SUMMARY OF THE INVENTION

When a standing tree is to be harvested in accordance with the present invention, the tree is delimbed as it is being felled. Accordingly, the overall time to perform the two operations may be reduced, since they are performed in an overlapping simultaneous manner.

The tree harvesting apparatus of the present invention includes a felling boom which is moved by a vehicle to a location adjacent to the standing tree. The trunk of the tree is then gripped and severed by gripper and shear assemblies on the felling boom. The standing tree is then felled through an arcuate path extending over the vehicle. As the tree is felled, a delimber assembly is moved along the trunk of the tree by a delimbing boom. Thus, the trunk of the tree is delimbed as it is felled from the standing position. The delimbed tree trunk is then deposited in a bunk assembly on the vehicle.

Accordingly, it is an object of this invention to provide a new and improved efficient method and apparatus for harvesting standing trees by delimbing a tree as it is felled.

Another object of this invention is to provide a new and improved tree harvesting apparatus which includes a gripper assembly which grips the trunk of the standing tree, a shear assembly which severs the trunk of the standing tree while it is gripped by the gripper assembly, and a delimber assembly which delimbs the tree as it moves from the standing position toward a fallen position.

Another object of this invention is to provide a new and improved method of harvesting trees which includes the steps of severing the trunk of a standing tree, felling the tree from the standing position to a fallen position, and delimbing the trunk of the tree as the tree moves from the standing position toward the fallen position.

Another object to this invention is to provide a new and improved apparatus for harvesting trees and which includes a device for moving the trunk of a tree along a first arcuate path extending over a vehicle, a delimbing boom which is connected with the vehicle and moves along a second arcuate path extending over the vehicle as the tree trunk moves along the first path, and a delimber means which delimbs the tree during movement of the trunk of the tree along the first arcuate path and movement of the delimbing boom along the second arcuate path.

Another object of this invention is to provide a new and improved method of delimbing trees which includes the steps of moving the trunk of a tree along a first arcuate path extending over a vehicle, moving a delimbing boom along a second arcuate path extending over a vehicle while the trunk of the tree is moving along the first arcuate path, and delimbing the trunk of the tree with a delimber assembly disposed on the delimbing boom as the delimbing boom moves along the second arcuate path.

BRIEF DESCRIPTION OF DRAWINGS

The foregoing and other objects and features of the present invention will become more apparent upon a consideration of the following description taken in connection with the accompanying drawings wherein.

DESCRIPTION OF A SPECIFIC PREFERRED EMBODIMENT

Figure 1:
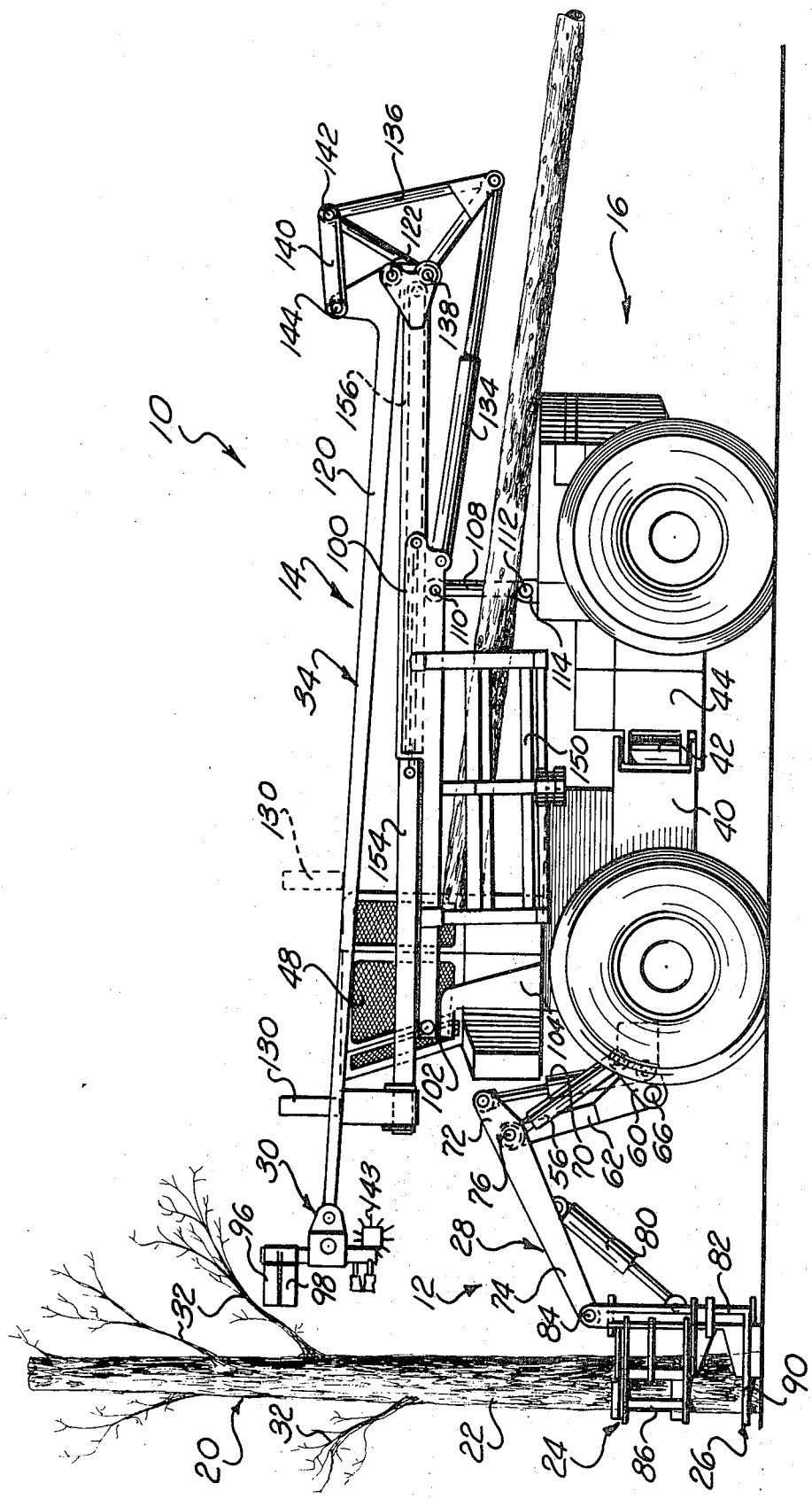
FIG. 1 is an elevational view depicting the gripping and shearing of the trunk of a standing tree with a tree harvesting apparatus constructed in accordance with the present invention.

A tree harvesting apparatus 10 constructed in accordance with the present invention includes a felling assembly 12 and a delimbing assembly 14 which are mounted on an articulated vehicle 16. When a standing tree 20 is to be delimbed, a trunk 22 of the tree is engaged by a gripper assembly 24 (FIG. 1) and is severed adjacent to the ground by a shear assembly 26. A felling boom 28 is then actuated to move the trunk of the tree into engagement with a delimber assembly 30. The felling boom 28 is then operated to fell the tree 20 from the standing position of FIG. 1 to a generally horizontal or fallen position. As the tree is being felled, the delimber assembly 30 is moved along the trunk 22 of the tree to sever or cut limbs 32 from the tree trunk in the manner illustrated schematically in FIG 2. The delimber head or assembly 20 is moved along the tree trunk 22 under the combined influence of a swing boom 34 and a drive assembly 36.

The articulated vehicle 16 has a front section 40 which is connected in a known manner at a hinge joint 42 wiith a rear section 44. An off-center operator's cab 48 is mounted on the front section 40 of the vehicle 16. The cab 48 is disposed over a right front wheel 52 (see FIG. 2) of the vehicle 16 to enable the delimbing assembly 14 to be centrally mounted on the body sections 40 and 44. In addition, this positioning of the cab 48 provides an operator with an unobstructed view of the felling assembly 12 to facilitate engaging the trunk of a standing tree with the gripper assembly 24.

When the standing tree 20 is to be harvested, the vehicle 16 is driven to a location adjacent to the tree. The felling boom 28 can be moved to either the right or left about a vertical axis disposed midway between the front wheels of the vehicle 16 by a suitable motor (not shown). This movement of the boom 28 positions the gripper assembly 24 in general alignment with the trunk 22 of the tree. Once the gripper assembly 24 is generally aligned with the trunk of the tree, a hydraulic motor 56 connected between a frame 60 of the vehicle 16 and a base or intermediate boom section 62 is extended. As the piston and cylinder type motor 56 is extended, the boom section 62 is pivoted forwardly about a connection 66. As the boom section 62 swings outwardly a second hydraulic motor 70 is operated. The piston and cylinder type motor 70 extends between the frame 60 and one end 72 of an intermediate boom section 74. Therefore, operation of the motor 70 pivots the intermediate boom section 74 about a connection 76 between the intermediate boom section and base boom section 62. As the two motors 56 and 70 are being operated, a third hydraulic motor 80 is actuated to swing an outer boom section 82 about a pivot connection 84 and into vertical alignment with the trunk 22 of the tree 20.

The gripper assembly 24 is mounted on the outer boom section 82. As the felling boom 28 is extended by operation of the boom motors 56, 70 and 80, gripper arms 86 and 88 (see FIGS. 1 and 2) are moved into position on opposite sides of the trunk 22 of the standing tree 20. The gripper arms 86 and 88 are then moved into tight clamping engagement with the trunk 22 of the tree by a suitable actuator motor (not shown). Since general construction and mode of operation of the gripper assembly 24 is known, the gripper assembly will not be further described herein to avoid prolixity of description.

Once the gripper assembly 24 has securely engaged the trunk 22 of the tree 20, the shear assembly 26 is actuated to sever the trunk adjacent to the ground. The shear assembly 26 includes a movable blade 90 which is pivoted toward a fixed blade 92 (FIG. 2) by a suitable motor (not shown). The movable and fixed blades 90 and 92 cooperate to sever the trunk of the tree in known manner.

Immediately after the trunk 22 is severed, the tree 20 is held in the upright standing position by the gripper assembly 24. The severed tree trunk 22 is moved into engagement with the delimber assembly 30 by retracting the felling boom 28. Thus once the trunk 22 of the tree has been severed, the hydraulic motor 56 is actuated to move the trunk 22 of the tree rearwardly into engagement with the delimber assembly 30. To facilitate engaging the tree trunk 22, the delimber assembly 30 is initially disposed forwardly of the front wheels and cab 48. If necessary, a suitable motor (not shown) can be actuated to pivot the base boom section 62 about a vertical axis which is disposed midway between the front wheels of the vehicle. It should be noted that the trunk 22 of the tree is maintained in the upright or standing position as it is moved rearwardly into engagement with the delimber assembly 30.

The delimber assembly 30 is then moved along the trunk of the tree by the delimber boom assembly 34 to strip the limbs 32 from the tree trunk 22. As the tree trunk 22 is being delimbed, it is moved from the standing or upright position of FIG. 1 toward a horizontal or fallen position. By delimbing the tree trunk as it is felled from the standing position, the total time required to fell and to delimb a tree is minimized since the felling and delimbing operations are performed at the same time.

The delimber assembly 30 includes a pair of delimbing blades 96 and 98 which circle the tree trunk 20. The delimbing blades 96 and 98 have relatively sharp upper edge portions (as viewed in FIG. 1) which readily sever the branches 32 from the trunk 22 as the delimbing assembly 30 is moved along the tree trunk. The blades 96 and 98 are pressed against the tree trunk 22 as the delimber assembly 30 is moved outwardly along the tree trunk and the diameter of the trunk decreases. When the diameter of the tree trunk 22 has decreased to a predetermined minimum diameter, the delimber assembly 30 tops or cuts off the relatively small diameter outer end portion of the tree trunk.

Figure 3:
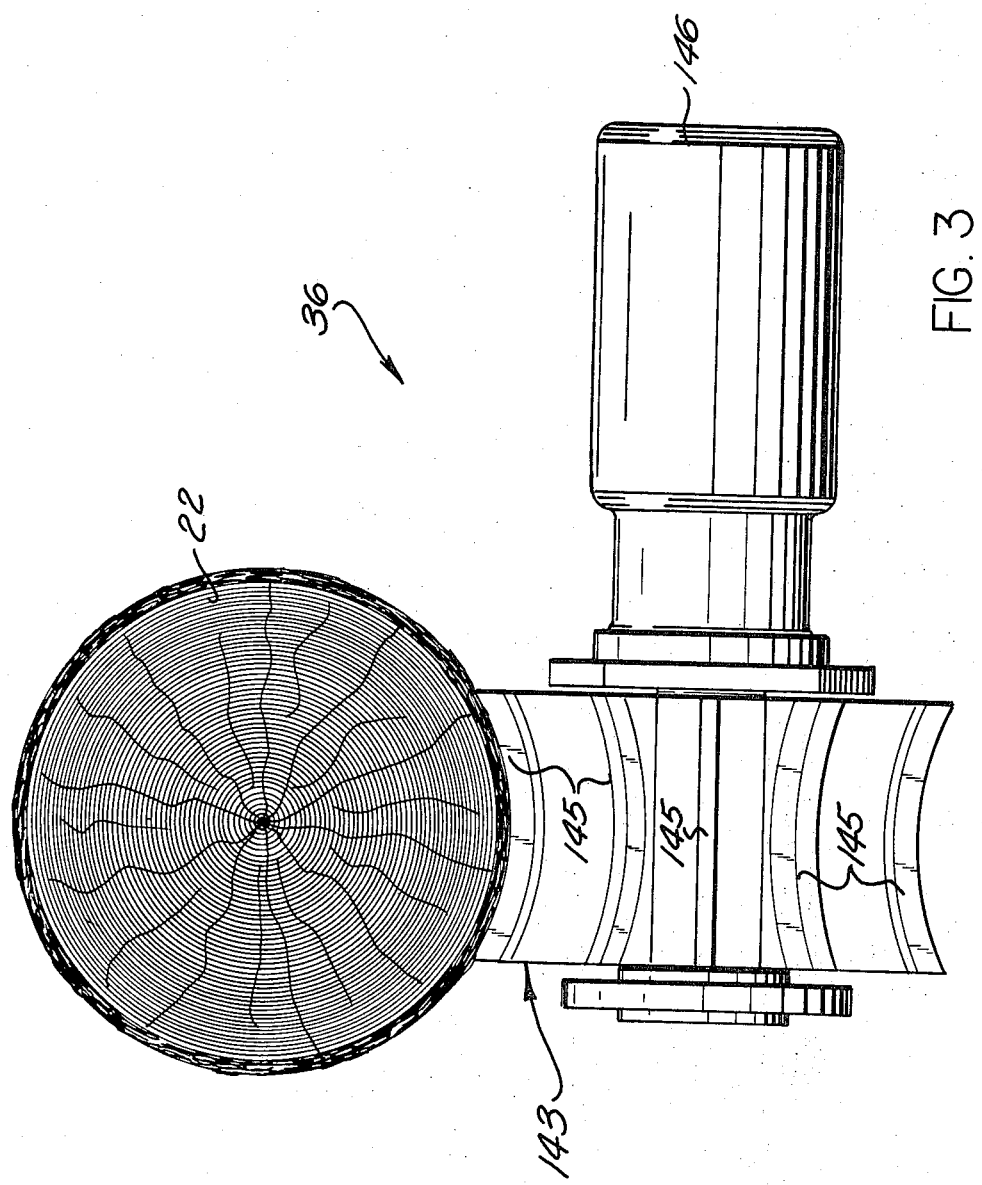
FIG. 3 is an enlarged view of a delimber drive which moves a delimber assembly along the trunk of a tree as it is being felled.

The delimber assembly 30 is moved along the trunk 22 of the tree 20 under the combined influence of the swing boom 34 and the drive mechanism 36 (FIG. 3). The boom 34 includes a base section 100. The base section 100 is pivotally connected at 102 with an upstanding support frame member 104 disposed approximately midway between the front wheels of the vehicle 16. A rear end portion of the base section 100 is connected with the rear body section 44 of the vehicle 16 by a link 108. To enable the front and rear sections 40 and 44 of the vehicle to move relative to each other, the link 108 is pivotally connected at 110 with the boom section 100 and is pivotally connected at 112 with a mounting flange 114. The universal pivot 110 is rotatable relative to the link 108 about a vertical axis. Upon relative movement between the front and rear sections 40 and 44 of the vehicle 16, the universal pivot 110 rotates and the link 108 is pivoted as the front and rear body sections move relative to each other.

As the tree 20 is felled from the standing position, the delimber assembly 30 is moved outwardly along the trunk 22 of the tree 20 by pivoting an outer section 120 of the swing boom 34 about a connection 122 with the inner or base section 100. This pivoting movement of the outer boom section 120 causes the delimber assembly 30 to move rearwardly along an arcuate path 126 (FIG. 2) from an initial position, shown in FIG. 1. As the delimber assembly 30 moves along the generally semi-circular path 126, the tree trunk is swung downwardly and rearwardly by the felling boom 28 and into engagement with a transfer clamp 130.

As the tree trunk 22 is being delimbed, it is swung downwardly and rearwardly along an arcuate path extending over the vehicle 16 by the felling assembly 12. Thus, the gripper assembly 24 maintains a secure grip on the butt end of the tree trunk 22 and is move upwardly and rearwardly by the outer boom section 82. To provide for this movement of the gripper assembly 24 and the trunk 22, the hydraulic motor 80 is extended to swing the outer boom section 82 upwardly. As the boom section 82 moves upwardly, the gripper 24 swings the tree trunk 22 through an arcuate path from the standing position of FIG. 1 toward a fallen position.

Figure 2:
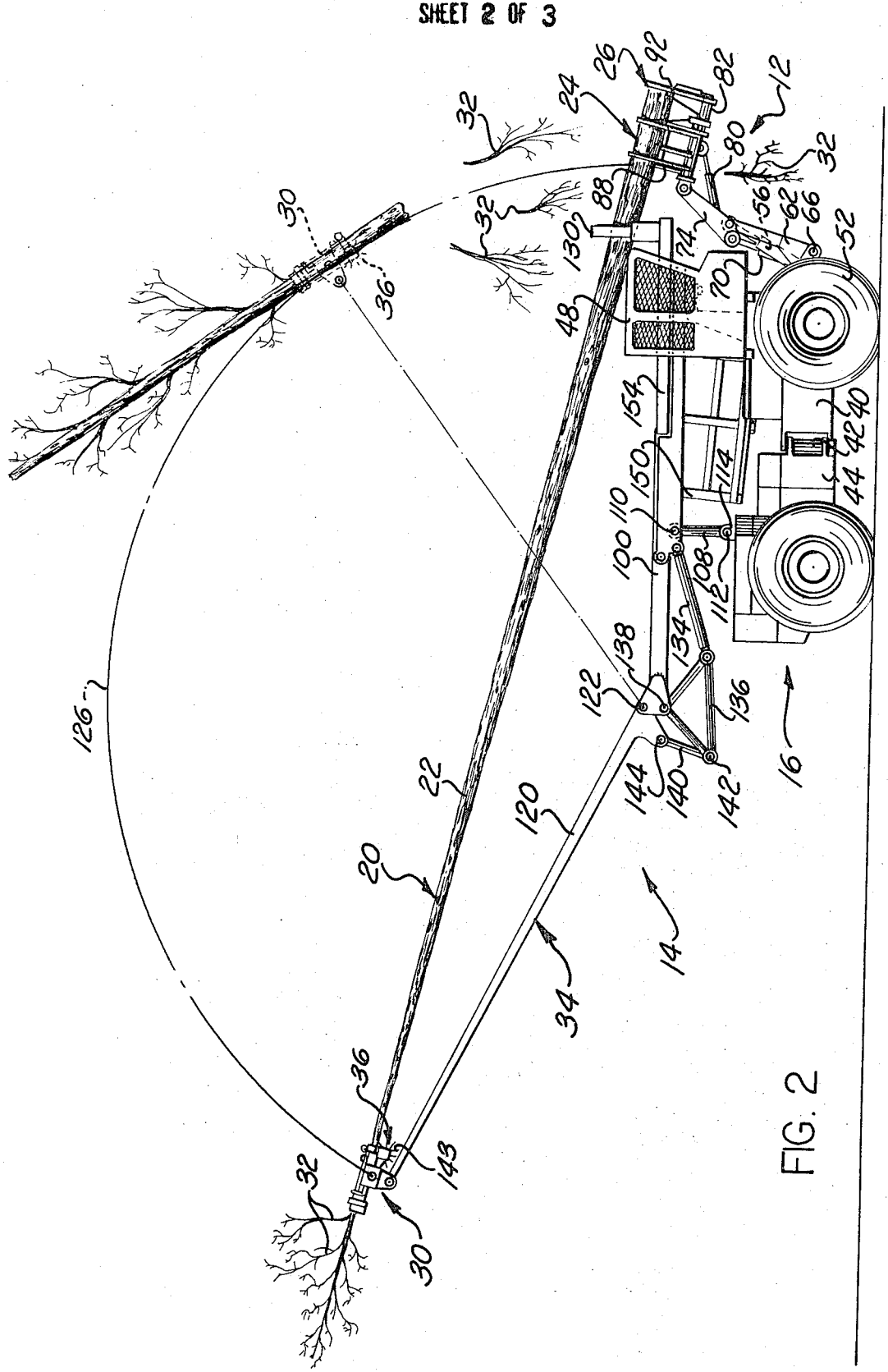
FIG. 2 is a schematic illustration depicting the delimbing of the trunk of a tree as the tree is felled from the standing position of FIG. 1.

As the tree trunk 22 is being swung along an arcuate path from the standing position of FIG. 1 toward a fallen position, the outer swing boom section 120 is pivoted about the connection 122 under the influence of a fluid motor 134. The fluid motor 134 is connected with the outer boom section 120 by a rocker frame assembly 136 which is pivotally connected to the base boom section 100 at 138 and is connected with the outer boom section 120 by a link 140. The link 140 is pivotally connected at 142 to the rocker frame section 136 and at 144 to the outer boom section 120. Thus, as the hydraulic motor 134 is contracted from the extended condition shown in FIG. 1, the rocker frame 136 pivots in a clockwise direction (as viewed in FIG. 1) to swing the boom section 120 upwardly and rearwardly along an arcuate path to the position shown in FIG. 2.

As the felling boom section 120 moves along this arcuate path, the delimber assembly 30 is moved along the trunk 22 of the tree 20 to delimb the tree. A drive assembly 36 assists in moving the delimber assembly 30 along the trunk 22 of the tree. The drive assembly 36 includes a circular drive wheel 143 (FIG. 3) having radially extending blades 145 which engage the trunk 22 of the tree 20. The drive wheel 143 is rotated about its central axis by a hydraulic drive motor 146. As the drive wheel 143 is rotated, the blades 145 dig or cut into the trunk 22 of the tree 20 and move the delimber assembly 30 outwardly along the tree trunk. Thus, the drive wheel 143 is rotated in a clockwise direction (as viewed in FIG. 2) to drive the delimber assembly outwardly along the tree trunk as the delimbing boom section 34 is pivoted about the connection 122.

Although it is contemplated that the butt end of the tree trunk 22 will be swung relative to the vehicle 16 by the felling boom assembly 28 as the tree trunk 22 is delimbed, it should be understood that the tree trunk could be swung under the influence of the delimbing boom assembly 14. In either case, the gripper assembly 24 will securely grip the trunk 22 of the tree and retain the tree against axial movement as the delimber assembly moves along the trunk of the tree.

After the tree trunk 22 has been delimbed and topped by the delimber assembly 30, the delimber assembly is disengaged from the tree trunk and it is transferred to a bunk assembly 150 by the transfer clamp 130. The trunk 22 of the tree 20 is moved into engagement with the transfer clamp 130 as the tree is felled from the standing position (see FIG. 2). The transfer clamp 130 is mounted forwardly of and midway between the front wheels of the vehicle 16 on a telescoping section 154 of the delimbing boom assembly 34. After the tree has been delimbed, the transfer clamp 130 is closed to grip the tree trunk 22.

Once the transfer clamp 130 has gripped the trunk 22 of the tree, the gripper assembly 24 is released. The butt end of the tree is then pulled rearwardly out of the gripper assembly by retracting a hydraulic motor 156 (see FIG. 1) to slide the boom section 154 rearwardly relative to the base section 100. This rearward movement of the boom section 154 moves the transfer clamp 130 from the position shown in solid lines in FIG. 1 to the position shown in dashed lines. During this rearward movement of the transfer clamp 130, the tree trunk 22 slides rearwardly until the butt end of the tree trunk is disposed slightly rearwardly of a forward end frame of the bunk assembly 150.

After the butt end of the tree trunk 22 has been moved rearwardly into alignment with the bunk assembly 150, the transfer clamp 130 is then rotated rearwardly, that is, toward the left side of the vehicle 16, to move the butt end of the delimbed and topped tree trunk into the bunk assembly 150. This movement can be effected by any suitable mechanism, not shown. The bunk assembly 150 may be of any particular type and construction, but preferably is of the stuffer type which engages and holds the butt end of the tree trunk after it is forced past one-way gates by the transfer clamp 130.

Once the delimbed and topped tree trunk 22 has been deposited in the bunk assembly 150, the delimbing boom assembly 14 is moved back to the retracted position of FIG. 1. Motor 15 is extended to reposition clamp 130 to its start position. The felling boom assembly 28 is retracted inwardly to its driving position. The vehicle 16 can then be readily driven to another location adjacent to the next tree to be felled. When the bunk assembly 150 is filled with delimbed and topped tree trunks, the vehicle 16 can be utilized to drag the tree trunks to an unloading location.

In view of the foregoing description, it can be seen that tree harvesting apparatus 10 includes a felling assembly 12 with a gripper assembly 24 which grips the trunk 22 of a standing tree as it is severed by a shear 26. The severed tree trunk is then moved by the felling boom 28 into engagement with the delimber assembly 30. The delimber assembly 30 delimbs the trunk 22 of the tree as the tree moves from the upright or standing position toward a fallen or horizontal position. The delimber assembly 30 is mounted on the outer end of a movable boom section 34 which is swung rearwardly along an arcuate path as the tree is felled. By delimbing the trunk 22 of the tree 20 as the tree is felled, the total time required for harvesting the tree 22 tends to be minimized.

Having described a specific preferred embodiment of the invention, the following is claimed:

1. An apparatus for felling and delimbing a tree comprising shear means for severing the trunk of a standing tree, means for effecting a felling of the tree from a standing position to a fallen position, and delimber means cooperating with said means for effecting felling and operable to delimb the tree in a unitary substantially continuous operational step as it moves from the standing position toward the fallen position, said delimber means including delimber head means for removing branches from the trunk of a tree as said delimber head means is moved along the trunk of the tree, and delimbing boom means for moving said delimber head means along the trunk of the tree as the tree moves from the standing position toward the fallen position.

2. An apparatus as set forth in claim 1 wherein said delimbing boom means includes a base, a boom section having a first end portion pivotally connected with said base, said delimber head means being disposed at a second end portion of said boom section, and means for pivoting said boom section relative to said base to move said delimber head means along the trunk of the tree as the tree moves from the standing position toward the fallen position.

3. An apparatus as set forth in claim 1 further including gripper means for gripping the trunk of a standing tree, a vehicle connected with said gripper means and with said delimber means, said delimbing boom means supporting said delimber head means for movement relative to the vehicle; and means for moving said delimbing boom means and delimber head means relative to the vehicle and the trunk of the tree as the tree moves from the standing positon toward the fallen position, said gripper means including a gripper assembly which grips the trunk of the tree as said delimbing head means moves along the trunk of the tree and gripper boom means for supporting said gripper assembly for movement relative to the vehicle as the tree moves from the standing position toward the fallen position.

4. An apparatus as set forth in claim 3 wherein said means for moving said delimbing boom means and delimber head means relative to the vehicle and trunk of the tree includes wheel means mounted on said delimbing boom means for drivingly engaging the trunk of a tree, and motor means for rotating said wheel means to move said delimber head means along the trunk of a tree.

5. An apparatus as set forth in claim 3 further including bunk means connected with said vehicle for receiving delimbed tree trunks, and transfer means for transferring a delimbed tree trunk from said gripper means to said bunk means.

6. An apparatus as set forth in claim 5 wherein said transfer means includes means for moving a delimbed tree trunk longitudinally out of engagement with said gripper means and sidewardly into said bunk means.

7. An apparatus for felling and delimbing a tree comprising gripper means for gripping the trunk of a standing tree; shear means for severing the trunk of a standing tree; means for effecting a felling of the tree from a standing position to a fallen position; delimber means including delimber head means for removing branches from the trunk of the tree as the tree moves from the standing toward the fallen position; a vehicle connected with said gripper means and said delimber means, said gripper means including means for supporting the trunk of the tree for movement along a generally arcuate path extending over the vehicle as the tree moves from the standing position toward the fallen position; and means for moving said delimber head means along the trunk of the tree from a first position adjacent said gripper means and the butt end portion of the tree trunk to a second position spaced from said gripper means and adjacent to the top end portion of the tree trunk as the tree trunk moves along the arcuate path.

8. An apparatus as set forth in claim 7 wherein said means for moving said delimber head means along the trunk of a tree includes a delimbing boom section having an inner end portion pivotally connected with said vehicle and an outer end portion connected with said delimber head means.

9. An apparatus as set forth in claim 7 wherein said delimbing boom section is disposed over said vehicle when said delimber head means is in the first position and is disposed outwardly of said vehicle when said delimber head means is in the second position.

10. An apparatus for delimbing trees comprising a vehicle, means for moving the trunk of a tree from a substantially standing position to a substantially felled positon along a first arcuate path extending over said vehicle, a delimbing boom connected with the vehicle, means for moving said delimbing boom along a second arcuate path extending over the vehicle, and delimber means connected with said delimbing boom for delimbing a tree during movement of the trunk of the tree from said standing position to said felled position along the first arcuate path and movement of said delimbing boom along the second arcuate path.

11. An apparatus as set forth in claim 10 wherein said means for moving the trunk of a tree along a first arcuate path includes gripper means for grippingly engaging the butt end portion of the trunk of a tree during delimbing of the tree by said delimbing means.

12. An apparatus for delimbing trees comprising a vehicle, means for moving the trunk of a tree along a first arcuate path extending over said vehicle, a delimbing boom connected with the vehicle, means for moving said delimbing boom along a second arcuate path extending over the vehicle, and delimber means connected with said delimbing boom for delimbing a tree during movement of the trunk of the tree along the first arcuate path and movement of said delimbing boom along the second arcuate path, said delimber means including rotatable wheel means for drivingly engaging the trunk of a tree and motor means for rotating said wheel means to move said delimber means along the trunk of a tree, and means for mounting said wheel means and motor means on an outer end portion of said delimbing boom.

13. An apparatus for delimbing trees comprising a vehicle, means for moving the trunk of a tree along a first arcuate path extending over said vehicle, a delimbing boom connected with the vehicle, means for moving said delimbing boom along a second arcuate path extending over the vehicle, and delimber means connected with said delimbing boom for delimbing a tree during movement of the trunk of the tree along the first arcuate path and movement of said delimbing boom along the second arcuate path, said vehicle being an articulated vehicle having relatively movable front and rear body sections, said delimbing boom including a base section connected to said front and rear body sections of said articulated vehicle and a boom section pivotally connected to said base section.

14. A method of felling and delimbing a tree comprising the steps of gripping the trunk of the standing tree with a gripper assembly disposed on a first boom, engaging the trunk of the tree with a delimber assembly disposed on a second boom, severing the trunk of the tree, pivoting the first boom to enable the tree to move from the standing position toward the fallen position with its trunk gripped by the gripper assembly, pivoting the second boom to enable the delimber assembly to move along the trunk of the tree as the tree moves from the standing position toward the fallen position, and delimbing the trunk of the tree as the tree moves from the standing position toward the fallen position.

15. A method of felling and delimbing a tree comprising the steps of severing the trunk of a standing tree, felling the tree from a standing position to a fallen position, engaging the trunk of the tree with a rotatable wheel connected to a delimber assembly, and moving the delimber assembly along the trunk of the tree by driving the wheel with a motor to rotate the wheel relative to the trunk of the tree as the tree moves from the standing position toward the fallen position.

16. A method of delimbing trees comprising the steps of moving the trunk of a tree from a substantially standing position to a substantially felled position along a first arcuate path extending over a vehicle, moving a delimbing boom along a second arcuate path extending over the vehicle while the trunk of the tree is moving along the first arcuate path, and delimbing the trunk of the tree with a delimber assembly disposed on the delimbing boom as the delimbing boom moves along the second arcuate path.

17. A method as set forth in claim 16 further including the steps of gripping the trunk of the tree with a gripper assembly disposed on a second boom during said step of delimbing the trunk of the tree, and moving the gripper assembly with the trunk of the tree as it moves along the second arcuate path by pivoting the second boom relative to the delimbing boom.

* * * * *

UNITED STATES PATENT OFFICE
CERTIFICATE OF CORRECTION

Patent No. 3,812,892        Dated May 28, 1974

Inventor(s) Stanley C. Jasinski et al.

It is certified that error appears in the above-identified patent and that said Letters Patent are hereby corrected as shown below:

[75] Inventors:    "Bryant Duffty" should read -- Bryan Duffty --. "Woodstoch, Ontario, Canada" should read -- Woodstock, Ontario, Canada --.

Signed and sealed this 17th day of September 1974.

(SEAL)
Attest:

McCOY M. GIBSON JR.
Attesting Officer

C. MARSHALL DANN
Commissioner of Patents